United States Patent [19]
Griepentrog et al.

[11] Patent Number: 5,587,745
[45] Date of Patent: Dec. 24, 1996

[54] ADJUSTMENT OF SCAN VELOCITY MODULATION CONCURRENT WITH THE AMOUNT OF TRANSITION RISE TIME, PRE-SHOOT, AND OVERSHOOT OF A VIDEO SIGNAL

[75] Inventors: Dal F. Griepentrog; Gene K. Sendelweck, both of Indianapolis, Ind.

[73] Assignee: Thomson Consumer Electronics, Inc., Indianapolis, Ind.

[21] Appl. No.: 269,583

[22] Filed: Jul. 5, 1994

[51] Int. Cl.⁶ .................................................. H04N 5/208
[52] U.S. Cl. ........................................ 348/626; 348/625
[58] Field of Search .................................. 348/625, 626, 348/630, 631; 315/399, 30; H04N 5/208, 5/21

[56] References Cited

U.S. PATENT DOCUMENTS

| | | | |
|---|---|---|---|
| 3,980,819 | 9/1976 | Schwartz | 348/625 |
| 5,072,300 | 12/1991 | Anderson | 358/242 |
| 5,164,829 | 11/1992 | Wada | 348/625 X |
| 5,179,320 | 1/1993 | Tripod | 315/399 |
| 5,196,941 | 3/1993 | Altmanshofer | 348/626 |

OTHER PUBLICATIONS

Data sheet AN5342K—Contour Correction IC—published prior to Applicants' filing date.

*Primary Examiner*—Victor R. Kostak
*Assistant Examiner*—John W. Miller

[57] ABSTRACT

A microprocessor generates an output signal in accordance with user controlled sharpness selection. The output signal is supplied to a video processor and to a scan velocity modulation circuit for concurrently varying in the same sense the amount of picture sharpness produced by the scan velocity modulation circuit and by the video processor.

13 Claims, 2 Drawing Sheets

ADJUSTMENT OF SCAN VELOCITY MODULATION CONCURRENT WITH THE AMOUNT OF TRANSITION RISE TIME, PRE-SHOOT, AND OVERSHOOT OF A VIDEO SIGNAL

This invention relates to adjusting the level of beam scan velocity modulation in a raster scanning display.

The sharpness of a video display may be increased by processing the video signal in a manner that emphasizes transitions in luminance that occur during scanning of horizontal lines. There are a number of techniques by which sharpness is increased, including edge replacement, luminance signal peaking and scan velocity modulation.

For scan velocity modulation, a differentiated luminance signal is caused to vary the horizontal scanning rate of the beam by driving an auxiliary deflection coil on the picture tube. The field generated by this coil adds to or subtracts from the magnetic field produced by the main horizontal deflection coils. The auxiliary coil modifies the horizontal scanning rate so as to emphasize transitions between light and dark areas of the display. For example, at a transition from black to white in a given horizontal scan line, the beam scanning speed is increased approaching the transition, thus making the display relatively darker in the black area. Upon passing the transition into the white area, the beam speed is decreased such that the beam dwells relatively longer and the screen phosphors appear brighter than they would otherwise. The reverse occurs in passing from light to dark. The same idea is applicable to lower gradations of luminance change than a sharp transition.

Scan velocity modulation is only one of several techniques which affect viewer perceived picture sharpness and can complement other techniques such as edge replacement and luminance peaking. Scan velocity modulation has advantages over peaking because it emphasizes transitions by modifying scanning speed without a corresponding increase in beam current, as compared to luminance peaking, which increases noise amplitudes and which, because it modifies beam intensity, may undesirably increase beam spot.

Picture sharpness may be manually controlled by controlling luminance peaking amplitude and the degree of edge replacement provided. In this situation, scan velocity modulation can work at cross purposes with the picture sharpness controls. If a user wishes to reduce apparent picture sharpness, for example, to produce a softer looking picture and/or to reduce noise, the scan velocity modulation circuit works to produce an opposite effect by providing increased sharpness. The result is a smaller span of sharpness adjustment.

Highly sensitive scan velocity modulation coils have recently become available, giving scan velocity modulation a potentially more prominent role in affecting picture sharpness. Higher sensitivity may require more precise control of the scan velocity modulation signal. It may, therefore, be advantageous to operate high drive or high sensitivity scan velocity modulation coils in a manner which is coordinated with edge replacement processing and luminance signal peaking, such that scan velocity modulation does not defeat full user control of picture sharpness adjustment.

In an inventive arrangement, a scan velocity modulation circuit is responsive to a video signal for modulating the scanning of an electron beam in a picture tube in accordance with the video content of the video signal. A video processing stage is also responsive to the video signal and modulates the intensity of the electron beam. A control circuit varies the amount of electron beam intensity modulation and the amount of electron beam scanning modulation.

Figure 1:
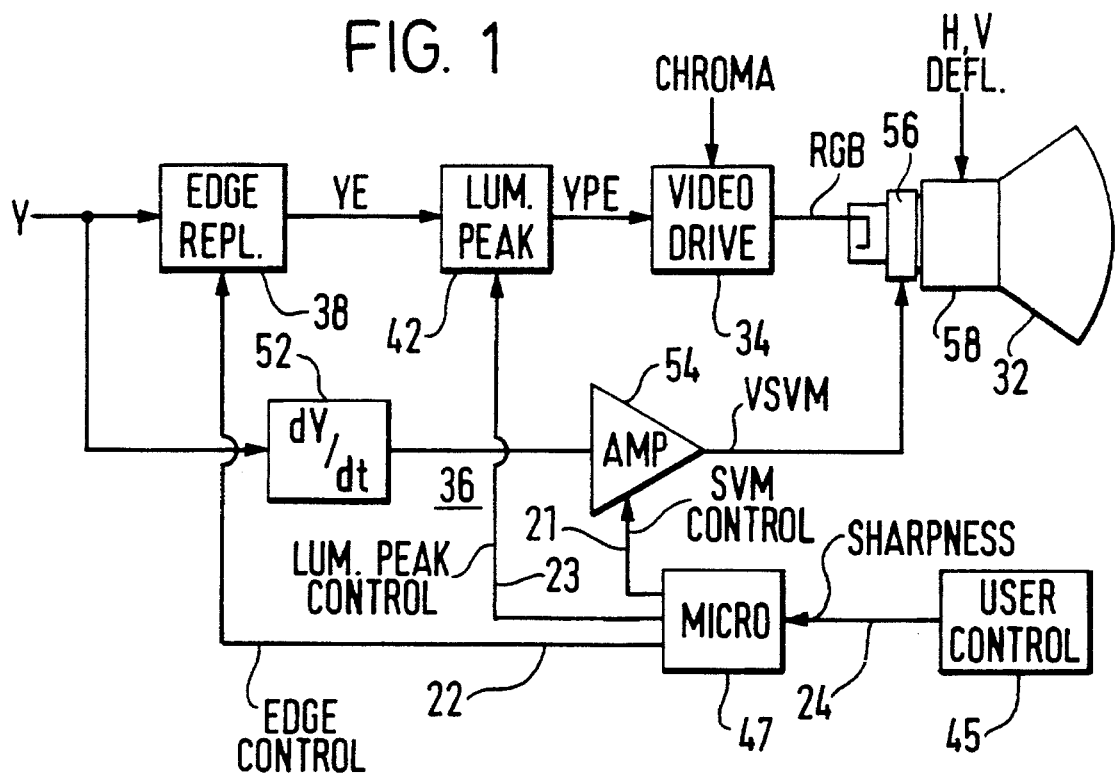
FIG. 1 is a block diagram, functionally illustrating an embodiment of an inventive scan velocity modulation circuit with sharpness control.

In FIG. 1, a cathode ray tube or picture tube 32 of a television receiver, video terminal or the like, is responsive to a luminance signal Y that controls the beam intensity drive, RGB, produced by a video driver circuit 34. To increase display sharpness, the television receiver circuits include a scan velocity modulation section 36, an edge replacement processor 38 and a luminance peaking circuit 42.

In scan velocity modulation section 36, the luminance signal Y is coupled to a differentiator 52 that develops a scan velocity modulation signal VSVM at the output of an amplifier 54 for driving a scan velocity modulation (SVM) device 56, such as an auxiliary deflection coil mounted on picture tube 32, or auxiliary electrostatic deflection plates, not shown. Raster scanning on the screen of picture tube 32 is accomplished by mounting horizontal and vertical deflection coils in a deflection yoke 58 against the neck and funnel of the picture tube.

The derivative dY/dt of luminance signal Y represents the extent to which the luminance signal is in transition from light to dark or dark to light. Picture sharpness is increased by causing the beam to pass more slowly than nominal, or even briefly to dwell, on the brighter side of a luminance transition, and to pass more quickly than nominal on the darker side of the transition.

Luminance signal Y also is processed with respect to the video drive of the electron gun in picture tube 32. Sharpness control in the video processing path provides control of beam current intensity, as opposed to the movement of the beam across the screen in the scan velocity modulation path. Edge replacement processor 38 is operable to adjust the contour of luminance signal Y to provide an enhanced luminance signal YE, by means of edge switching functions. Luminance signal YE is then coupled to luminance peaking circuit 42, which further adjusts the contour of the luminance signal during horizontal scanning. This provides additional, enhanced sharpness by introducing preshoots and overshoots to the luminance signal at signal transitions. The resulting edge corrected and peaked output signal YPE is coupled to video driver 34 to produce, in conjunction with chroma information, the RGB drive signal for picture tube 32.

According to an inventive feature, as shown in FIG. 1, the amount of scan velocity modulation is reduced as a function of a user's selection of a sharpness level. The user input may be generated by a manual, user control stage 45, such as an infrared signalling device that interacts with an infrared receiver, not shown in FIG. 1. User control 45 is coupled via a signal line 24 to a microprocessor controller 47, which also controls other selections, such as channel, volume, color, or tint. Advantageously, microprocessor 47 controls scan velocity modulation section 36 via a control line 21, edge replacement processor 38 via a control line 22, and luminance peaking circuit 42 via a control line 23, each as a function of the sharpness selection established on signal line 24. Scan velocity modulation may be controlled by, e.g. controlling the gain or limiting operation of amplifier 54.

Figure 2:
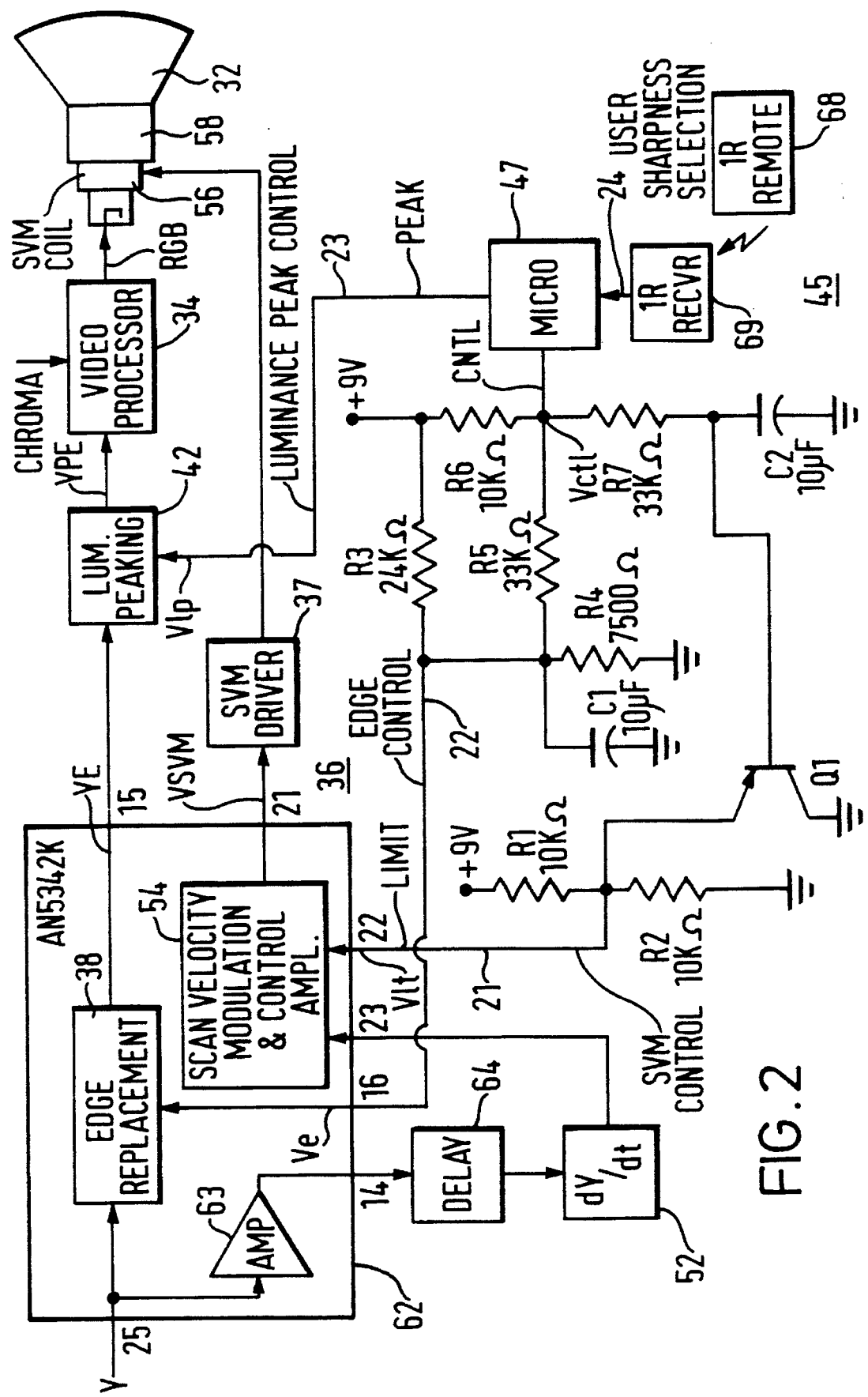
FIG. 2 is a schematic diagram showing a particular execution of the circuit according to FIG. 1.

An exemplary embodiment of the circuitry of FIG. 1 is shown in FIG. 2. Similar items in the two figures are similarly identified. Luminance signal Y is coupled to an input of a video processor integrated circuit 62, such as the AN5342K Contour Correction IC. Luminance signal Y is coupled through edge replacement section 38 in video processor 62, and is also coupled to a luminance signal amplifier 63, a delay circuit 64 and differentiator 52. The output of differentiator 52 is coupled to a scan velocity modulation signal input, at pin 23 of video processor 62. A scan velocity modulation drive signal VSVM is produced at an output pin 21 of video processor 62, and is coupled to a scan velocity modulation driver 37 that produces drive current to scan velocity modulation coil 56 on picture tube 32.

Scan velocity modulation control section 36 is partially included in video processor 62, where amplifier 54 is internal to the IC and is part of a scan velocity modulation and control amplifier which receives the differentiated luminance signal at pin 23. The output signal VSVM of amplifier 54 at pin 21 is variably limited, under control of a DC voltage developed at a limit input pin 22. The effect of limiting output signal VSVM, is to limit the drive current supplied to SVM coil 56 when the differentiated luminance signal amplitudes become excessive. Advantageously, this limit point is not fixed but is controlled by microprocessor 47 of the television receiver. Furthermore, controlling the point at which SVM limiting begins is just as effective in controlling perceived sharpness as controlling the linear gain in the SVM processing channel.

Figure 3:
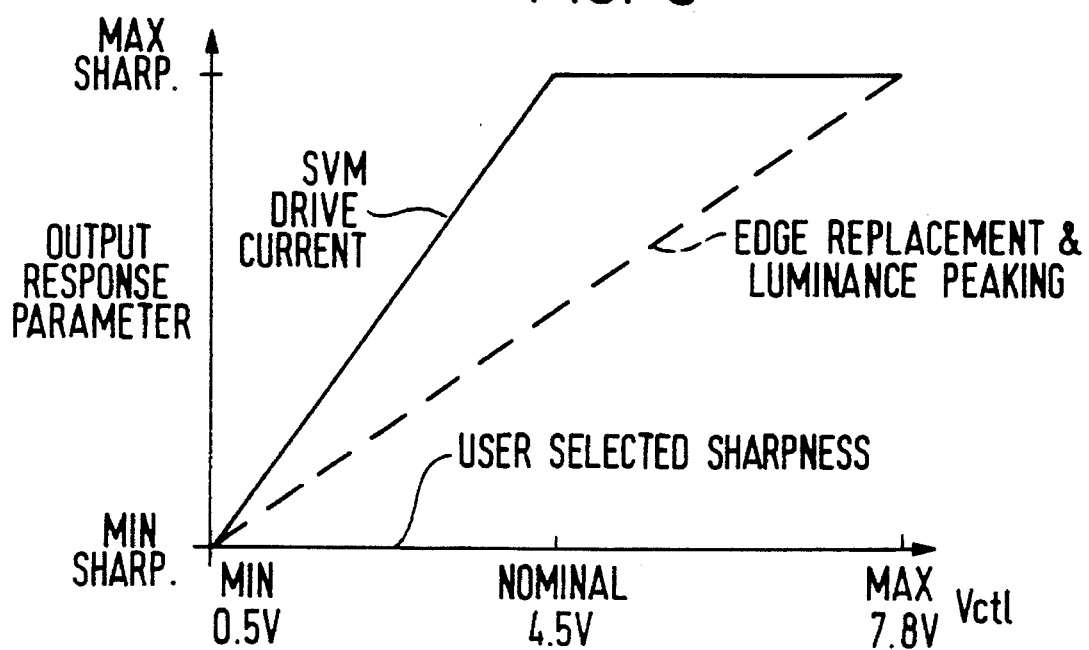
FIG. 3 is a plot of scan velocity modulation amplitude and edge replacement/peaking amplitude, as a function of user selected sharpness.

According to an inventive feature, user sharpness input, provided by manual, user control stage 45, is supplied to microprocessor 47. Microprocessor 47 then produces DC control level outputs for edge replacement section 38, luminance peaking circuit 42 and scan velocity modulation section 36. Advantageously, the DC control levels applied by microprocessor 47 to the respective control inputs for edge replacement, luminance peaking and scan velocity modulation, generate a different output response for scan velocity modulation drive than for edge replacement and luminance peaking, in the manner illustrated in FIG. 3.

As the user selected sharpness is varied between a minimum sharpness and a maximum sharpness, the edge and luminance peaking output response parameters vary accordingly from minimum to maximum. The output response parameter for scan velocity modulation, on the other hand, is arranged to vary over its full range across a more limited range of sharpness adjustment, and to stay at maximum response when the sharpness adjustment is greater than a predetermined, e.g. nominal, level of user selected sharpness.

Limit input pin 22 is coupled to resistors R1 and R2, which form a voltage divider between ground and a +9 V DC supply. When an emitter-follower buffer transistor Q1 is cut-off, the DC voltage, Vlt, at limit input pin 22 is set to 4.5 volts. Transistor Q1, acting as a threshold device, begins to conduct when the voltage at its base, as established by the voltage across a capacitor C2, falls below that necessary to forward bias the emitter-base junction, i.e. at about 3.8 volts in the illustrated embodiment. Microprocessor 47 controls the voltage on capacitor C2 by coupling the capacitor to a CNTL output of the microprocessor via a resistor R7. Microprocessor 47 varies the voltage Vctl at the CNTL output, based on the amount of user selected sharpness established on signal line 24 by user control stage 45, shown in FIG. 2 as an infrared remote control 68 and an infrared receiver 69.

When the voltage on the base of transistor Q1 is higher than 3.8 volts, the scan velocity modulation control voltage at limit input pin 22 stays at 4.5 volts, as set by resistors R1 and R2. As microprocessor 47 reduces the voltage across capacitor C2, transistor Q1 conducts a proportionally higher current, pulling down the limit pin voltage through resistor R1, and controlling the limit input over a range that is less than the range of voltage variation provided by the CNTL output of the microprocessor. Minimum limiting and maximum scan velocity modulation are achieved and maintained at and above a nominal user selected sharpness, i.e. at and above the midpoint. Between nominal and minimum sharpness, the limiting follows voltage Vctl at the CNTL output.

In contrast, the voltage Ve at edge control input pin 16 varies proportionately with the voltage at the CNTL output of microprocessor 47, over the full range of user selected sharpness. To produce this result, a resistor R3 and a resistor R4 form a voltage divider between the +9 V supply and ground, with edge control input pin 16 being coupled at the junction of these two resistors to the CNTL output of microprocessor 47 via a resistor R5. A filter capacitor C1 is coupled to edge control input pin 16.

Microprocessor 47 produces an additional DC control voltage, Vlp, coupled to luminance peaking circuit 42 via control line 23. When peaking control voltage Vlp is varied over its full range of sharpness adjustment values, the peaking preshoot and overshoot output responses track across the entire range.

Sharpness control outputs which control the luminance signal drive to the electron gun are provided by the CNTL output and the luminance peaking control PEAK output of the microprocessor, over the full sharpness selection range that is user controlled. Although scan velocity modulation control is also supplied by one of these microprocessor control outputs, the action of transistor Q1, conducting only when the control voltage Vctl falls below a threshold level, produces a fixed maximum scan velocity modulation drive when user sharpness selections are between maximum and nominal levels, with decreasing drive being produced only thereafter. In this way, when the user selects a sharpness below nominal, the tendency of scan velocity modulation to oppose the user's selection is progressively decreased. Thus, at some point, when the user desires a softer picture, the SVM drive is automatically and correspondingly reduced to prevent the SVM circuit from adversely counteracting picture softness control.

As a specific example of user selected sharpness control of SVM, edge replacement and luminance peaking, consider an input Y signal which is a 50 IRE T/2 black-to-white step. When Vctl is made to vary over its full range of MIN=0.5 V to MAX=7.8 V, the edge replacement output parameter, Tr, varies over its full range, between 240 nS and 60 nS, where Tr=10 to 90 percent transition rise time. Similarly, when Vctl is varied over the previously mentioned range, the luminance peaking output parameter, PS, varies over its full range between 2% and 15%, where PS=preshoot in percent of transition amplitude; and the luminance peaking output parameter, OS, varies over its full range, between 0% and 15%, where OS=overshoot in percent of transition amplitude.

In contrast, the scan velocity modulation drive current output parameter goes from a zero current level (MIN) to a 1.4 A peak-to-peak current level (MAX) when Vctl is made to vary over a smaller range, between a minimum level of 0.5 V and a nominal or intermediate level of 4.5 V. Above the 4.5 V level, any further increase in control voltage Vctl produces no significant further increase in SVM drive current.

What is claimed is:

1. A scan velocity modulation circuit comprising:

a picture tube;

a source of a video signal;

a video processing stage coupled to said source for modulating an intensity of an electron beam in said picture tube responsive to said video signal;

edge replacement means for modulating the transition rise time of said video signal;

peaking means for modulating pre-shoots and overshoots of said video signal;

scan modulating means responsive to said video signal for modulating scanning of said electron beam in accordance with video content of said video signal;

a source of a control signal; and control means having an input coupled to said control signal, an output coupled to said edge replacement means, to said peaking means and to said scan modulating means, for concurrently varying an amount of transition rise time of said video signal, an amount of pre-shoot and overshoot of said video signal, and an amount of electron beam scanning modulation produced by said scan modulating means, in accordance with said control signal.

2. A circuit according to claim 1 wherein said control signal comprises a sharpness control signal representing sharpness of a picture displayed on said picture tube.

3. A circuit according to claim 1 wherein said control signal varies the amount of electron beam scanning modulation in the same sense as it varies the amount of pre-shoots and over-shoots of said video signal.

4. A circuit according to claim 1 wherein said control signal comprises a sharpness control signal representing sharpness of a picture displayed on said picture tube, said sharpness control signal reducing the sharpness produced by said scan modulation means as said control signal reduces the sharpness produced by said peaking means.

5. A circuit according to claim 1 wherein said control means comprises a microprocessor responsive to said control signal representative of picture sharpness,.

6. A circuit according to claim 5 wherein said microprocessor generates an output signal which varies as said control signal varies and which splits into two supply signals, the first supply signal being supplied to said video processor stage and the second supply signal being supplied to said scan modulating means.

7. A circuit according to claim 6 wherein said first supply signal is supplied to an edge replacement section within said video processor stage.

8. A circuit according to claim 1 wherein said control means varies the amount of electron beam scanning modulation by varying a point where limiting begins in said scan modulation means.

9. A scan velocity modulation circuit comprising:

a picture tube;

a source of a video signal;

a video processing stage coupled to said source for modulating an intensity of an electron beam in said picture tube responsive to said video signal;

scan modulating means responsive to said video signal for modulating scanning of said electron beam in accordance with video content of said video signal;

a source of a control signal; and control means coupled to said video processing stage and to said modulating means for concurrently varying an amount of electron beam intensity modulation produced by said video processing stage and an amount of electron beam scanning modulation produced by said scan modulating means in accordance with said control signal;

wherein said control signal varies over a first range of values when varying the amount of electron beam intensity modulation over its full range of values, and said control signal varies over a range of values smaller than said first range when varying the amount of electron beam scanning modulation over its full range.

10. A circuit according to claim 9 wherein said control means includes a threshold circuit responsive to said control signal for supplying an input signal to said scan modulating means, a threshold level produced by said threshold circuit, establishing said smaller range of values.

11. A scan velocity modulation circuit comprising:

a picture tube;

a source of a video signal;

a video processing stage coupled to said source for modulating an intensity of an electron beam in said picture tube responsive to said video signal;

scan modulating means responsive to said video signal for modulating scanning of said electron beam in accordance with video content of said video signal;

a source of a control signal; and control means coupled to said video processing stage and to said modulating means for concurrently varying an amount of electron beam intensity modulation produced by said video processing stage and an amount of electron beam scanning modulation produced by said scan modulating means in accordance with said control signal;

wherein said control signal comprises a sharpness control signal representing sharpness of a picture displayed on said picture tube, said sharpness control signal reducing the sharpness produced by said scan modulation means as said control signal reduces the sharpness produced by said video processing stage: and wherein said sharpness control signal varies from maximum sharpness control to a minimum sharpness control for correspondingly varying the sharpness produced by said video processing stage from maximum to minimum, whereas said sharpness control signal varies from a point intermediate of maximum and minimum sharpness control for varying the sharpness produced by said scan modulating means from maximum to minimum.

12. A circuit according to claim 11 wherein said control means includes a threshold circuit responsive to said control signal for supplying an input signal to said scan modulating means only when said sharpness control signal varies from said point of intermediate sharpness control to said minimum sharpness control.

13. A scan velocity modulation circuit comprising:

a picture tube;

a source of a video signal;

a video processing stage coupled to said source for modulating an intensity of an electron beam in said picture tube responsive to said video signal;

scan modulating means responsive to said video signal for modulating scanning of said electron beam in accordance with video content of said video signal;

a source of a control signal; and control means coupled to said video processing stage and to said modulating means for concurrently varying an amount of electron beam intensity modulation produced by said video processing stage, and an amount of electron beam scanning modulation produced by said scan modulating means, in accordance with said control signal, wherein said control signal comprises a sharpness control signal representing sharpness of a picture displayed on said picture tube, and wherein the second supply signal is supplied to said scan modulating means via a threshold circuit for varying the sharpness produced by said scan modulating means over its full range of values, as said microprocessor output signal varies over a smaller range of values than the range of output signal values required to vary the sharpness produced by said video processor stage over its full range of values.

* * * * *